United States Patent [19]

Coke

[11] Patent Number: 5,145,585
[45] Date of Patent: Sep. 8, 1992

[54] METHOD AND APPARATUS FOR TREATING WATER IN A COOLING SYSTEM

[76] Inventor: Alden L. Coke, 9413 Old Harford Rd., Baltimore, Md. 21234

[21] Appl. No.: 727,955

[22] Filed: Jul. 10, 1991

Related U.S. Application Data

[63] Continuation of Ser. No. 478,835, Feb. 9, 1990, abandoned.

[51] Int. Cl.$^5$ ............................ C02F 1/48; C02F 1/78
[52] U.S. Cl. .................................. 210/695; 210/90; 210/96.1; 210/167; 210/192; 210/195.1; 210/202; 210/206; 210/223; 210/259; 210/304; 210/512.1; 210/743; 210/760; 210/787; 210/790; 210/805; 261/DIG. 11; 261/DIG. 42; 261/DIG. 46
[58] Field of Search ................. 210/90, 96.1, 167, 177, 210/182, 192, 195.1, 202, 206, 222, 223, 254, 259, 304, 512.1, 695, 743, 746, 760, 787, 790, 805; 261/DIG. 11, DIG. 42, DIG. 46; 62/310; 422/186.07, 186.09, 22, 29

[56] References Cited

U.S. PATENT DOCUMENTS

| | | | |
|---|---|---|---|
| 1,853,045 | 4/1932 | Gnau | 261/DIG. 42 |
| 3,421,625 | 1/1969 | Fritz | 210/101 |
| 3,448,045 | 6/1969 | Hess et al. | 210/63 |
| 3,510,890 | 5/1970 | Estabrook | 210/167 |
| 4,029,114 | 6/1977 | Wiltrout | 210/108 |
| 4,119,156 | 9/1978 | Draxler | 210/90 |
| 4,172,786 | 10/1979 | Frosch et al. | 210/57 |
| 4,584,107 | 4/1986 | Odaka et al. | 210/760 |
| 4,645,606 | 2/1987 | Ashbrook | 210/695 |
| 4,652,370 | 3/1987 | Bachhofer | 210/192 |
| 4,764,283 | 8/1988 | Ashbrook et al. | 210/760 |
| 4,830,761 | 5/1989 | Leach et al. | 210/195.1 |
| 4,877,588 | 10/1989 | Ditzler et al. | 422/186.07 |
| 4,931,187 | 6/1990 | Derham et al. | 210/743 |
| 4,959,142 | 9/1990 | Dempo | 210/167 |

FOREIGN PATENT DOCUMENTS

| | | | |
|---|---|---|---|
| 200914 | 3/1955 | Australia | 210/760 |
| 60-168593 | 9/1985 | Japan | 210/743 |
| 63-200891 | 8/1988 | Japan | |
| 63-291696 | 11/1988 | Japan | 210/746 |
| J01262987 | 10/1989 | Japan | 210/222 |

*Primary Examiner*—Robert A. Dawson
*Assistant Examiner*—Matthew O. Savage
*Attorney, Agent, or Firm*—Roy W. Butrum

[57] ABSTRACT

A method for treating water in a cooling system including a cooling tower and heat exchanger are disclosed herein. The method includes the steps of removing water from the main cooling water circuit, serially subjecting the water to magnetic treatment, treatment with ozone, filtering with a centrifugal separator, and then returning to the main cooling water circuit. Underflow from the centrifugal separator is filtered with a bag filter, and the filtered water returned to the magnetic treatment step. The pH of the water may be controlled by regulating the production of dry air supplied to the ozone generator.

14 Claims, 1 Drawing Sheet

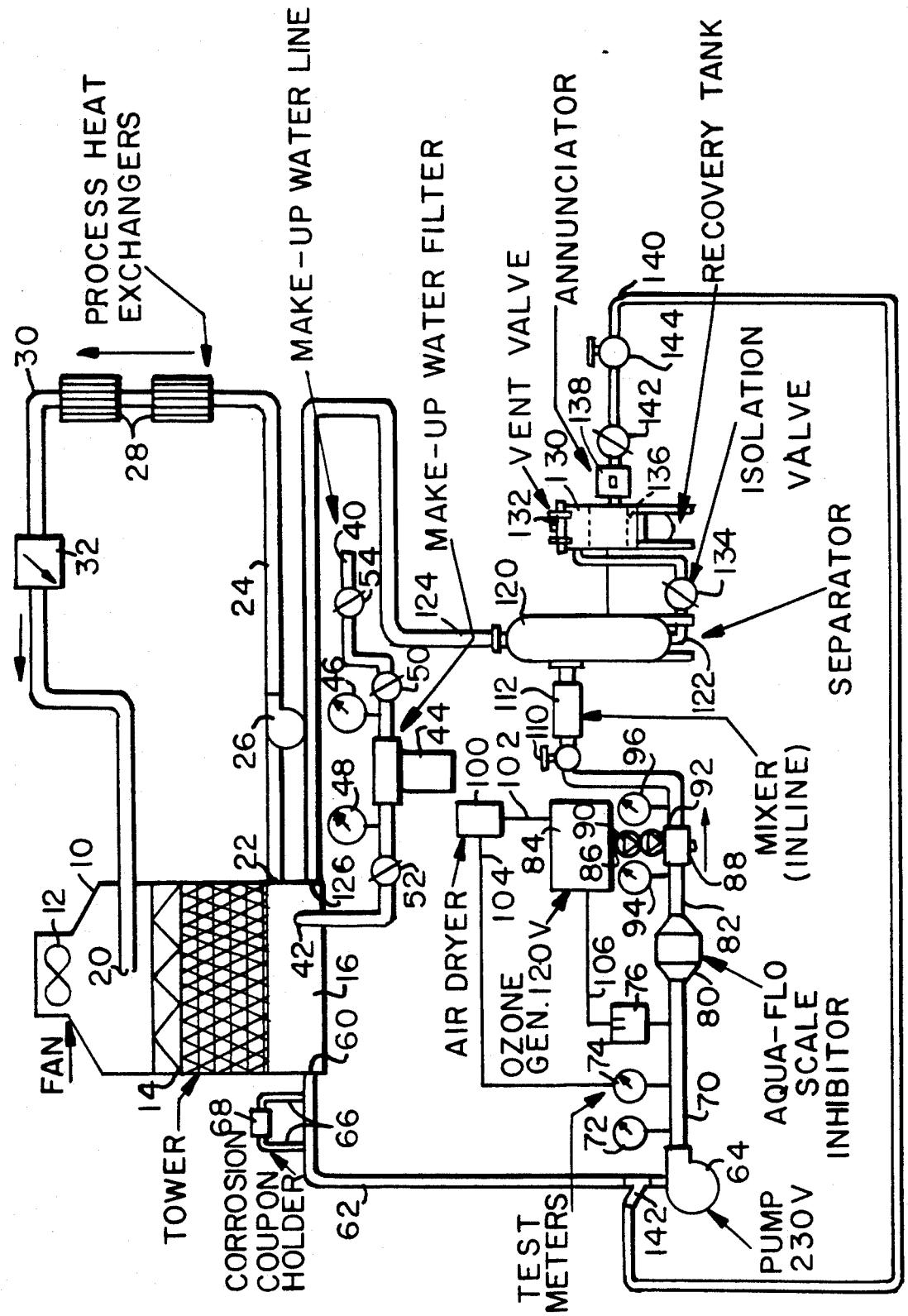

METHOD AND APPARATUS FOR TREATING WATER IN A COOLING SYSTEM

CROSS-REFERENCE TO RELATED APPLICATION

The present application is a continuation of application Ser. No. 478,835, filed Feb. 9, 1990 now abandoned.

BACKGROUND OF THE INVENTION

The present invention relates to the treatment of water in a cooling system such as that employed in the air conditioning apparatus of a building. Such systems commonly include heat exchangers through which cooling water flows, the water being cooled by partial evaporation in air as the water falls by gravity within a cooling tower which is usually mounted on the roof of the building.

Three main impurity problems are encountered in the treatment of water in cooling systems including a cooling tower. The first significant problem is fouling of the system which is caused by the growth of algae and slime caused by bacteria and fungi. Such fouling reduces both water flow and heat transfer efficiency. Until recently, the recognized method of controlling algae, scaling and corrosion has been to employ a variety of chemical additives. A broad range of chemicals have been required to keep these contaminants under control. Constant care and changing of the type of chemicals has been a necessity for maintaining algae free systems. This is time consuming and extremely costly, and additionally creates an environmental hazard due to dumping of excessive chemicals to sewerage or storm drain systems.

The second significant impurity problem is corrosion. Over a period of time, corrosion due to organic secretion and decay will require extensive repair and replacement of costly equipment. Corrosion control chemicals are equally difficult to maintain due to various types of corrosion problems. Chemicals such as alkaline chromates are effective in reducing all types of corrosion. However, they are extremely dangerous and highly toxic compounds, which necessitate secondary bleed water treatment processes before the bleed water is allowed to be dumped. This is an extremely expensive process.

The third significant impurity problem, and by far the most common problem, is scaling. Scaling is caused by the deposition of dissolved minerals on the cooling tower baffles and particularly on the hot surface areas in the condenser tubes of the heat exchanger where heat transfer is most important.

Current methods of solving scale problems are to reduce the total dissolved solids in the system. One method is by increasing the bleed water rate; however, this is very expensive in areas where water supply costs and sewage charges are expensive. Dissolved solids in water build up to a limit where no more material can be dissolved in water. At this limit, the addition of further material will cause either a sludge or scale to form. Controlling cycles of concentration in the recirculating water is customarily done by bleeding off sump water until a satisfactory limit of solids in the water is reached.

Another method of preventing scale is to reduce the hardness and alkalinity of water by supplying the cooling tower with softened water through the ion exchange process. However, the high usage of salt in the brine solution used to regenerate the water softeners causes this method to be chemical intensive and expensive. Polysphosphates may be introduced into the system for sequestering the calcium and magnesium minerals so that they don't precipitate out as scale formation. This is also an expensive method of scale control and adds to the total dissolved solids factor on a molecular ratio of one to one. Polyphosphate treatment is also controlled by the ph factor; higher ph values above 8.5 tend to reduce its effectiveness and consequently an increase in bleed off rate is required which adds a further cost.

Other treatment processes have been tried from time to time with varying degrees of success. A variety of filtration type products have been tried. Electromagnetic descaling devices, permanent magnetic descaling devices and catalytic type scale inhibitor devices have also been employed. Ozone generating devices have been utilized for introducing ozone into the recirculating water. However, these various processes taken either alone or in combination with one another have not been able to provide the ultimate goal of providing a cooling system which eliminates the necessity of adding chemicals to the system with the attendant problems, and further which eliminates the requirement of bleeding water to the system thereby providing a zero bleed system.

SUMMARY OF THE INVENTION

The present invention solves the problems and eliminates the disadvantages of prior art systems by providing a method and self-contained apparatus which totally eliminates the use of any chemicals and further eliminates the necessity of bleeding water from the system. Accordingly, the desired result is reached of providing an arrangement wherein a cooling tower can be continuously run year after year without adding any chemicals and without wasting water in a bleed off process.

The system includes a conventional main water circuit wherein water is circulated through a heat exchanger and a cooling tower. A minor portion of the water circulating through the main water circuit passes through a closed by-pass circuit and is returned to the main water circuit. The water is sequentially treated as it passes through the by-pass circuit.

It is first subjected to a magnetic field to polarize solids in the water which allows more solids to stay in solution in the water, thereby resulting in descaling of the system. Ozone is then injected into the water to oxidize and kill algae, slime and bacteria as well as to enhance descaling of the system. Various characteristics of the water passing through the by-pass circuit are measured, and the injection of ozone into the water in the circuit is controlled in accordance with the measured characteristics.

The ozone is thoroughly mixed with the water in the by-pass circuit, and is then passed through a centrifugal separator to remove solids of a certain size from the water. The clarified water is then returned to the main water circuit. The system also includes a closed recovery circuit. A part of the water circulating through the by-pass circuit passes through the closed recovery circuit where the water passes through a recovery tank including a filter bag for removing solids of a smaller size from the water. The filter bag is periodically emptied, and the water in the recovery circuit is then returned to the by-pass circuit.

With the arrangement of the present invention, no chemicals whatsoever are employed, and there is no necessity for bleeding water from the system, thereby enabling continuous trouble-free operation of the system with a minimum amount of monitoring and maintenance by operating personnel.

BRIEF DESCRIPTION OF THE FIGURE

The sole figure is a schematic illustration of the manner of treating water in a cooling system according to the invention.

DESCRIPTION OF THE PREFERRED EMBODIMENT

Referring now to the figure, a conventional cooling tower 10 is provided with a fan 12 which blows air downwardly over baffles 14 in the usual manner. A sump 16 is provided at the bottom of the tower, and warm water is discharged at a point 20 above the baffles. The water is cooled by partial evaporation in the air as the water falls by gravity and is deflected by the baffles.

The sump includes a first outlet 22 which is in communication with a conduit 24 having a pump 26 connected therein. The pump circulates water from the tower to the inlet of a conventional heat exchanger indicated schematically at 28. The outlet of the heat exchanger is connected to a conduit 30 having a control valve 32 therein for controlling the flow of water through the conduit. Conduit 30 terminates at the discharge point 20.

The water is continuously circulated through the main water circuit including the cooling tower 10, the pump 26, the heat exchanger 28 and the conduits 24 and 30 connecting the cooling tower and heat exchanger to one another.

A water make-up conduit 40 is connected to any suitable source of water and discharges at point 42 into the sump of the cooling tower. A conventional water filter 44 is connected in conduit 40 for filtering out solid materials. Pressure gauges 46 and 48 are connected in conduit 40 upstream and downstream of filter 44, and may be monitored to determine the pressure drop across the filter. When the pressure drop becomes too great, the filter must be replaced. Manually operated valves 50 and 52 are connected in conduit 40 to isolate filter 44 when it is necessary to change the filter. A conventional make-up water meter and totalizer 54 is connected to conduit 40 to provide a record of the amount of water actually used in the system during any particular period of time.

The sump of the cooling tower includes a second outlet 60 which is in communication with a conduit 62 connected to the inlet of a pump 64 for removing a minor portion of the water circulating through the heat exchanger and cooling tower. A small conduit 66 is connected with conduit 62 and has a conventional corrosion coupon holder 68 therein. Conduit 66 forms a loop which receives a small sample of the water within the cooling system. Corrosion coupon holder 68 receives a piece of material or multiple pieces of material called coupons therein which is the same type of material as that which is in contact with water within the cooling system, and water circulating through conduit 62 is in contact with the coupon or coupons. The coupon or coupons may be removed from the holder when desired to determine the amount of scaling and/or corrosion existing within the system.

The outlet of pump 64 is connected with a conduit 70 having three meters 72, 74 and 76 connected thereto. Meter 72 is a conductivity meter. Meter 74 is a ph meter, and meter 76 is an oxidation reduction potential (ORP) meter. Conduit 70 is connected with the inlet of a scale inhibitor means 80 which comprises a device for polarizing positively charged ions in solution in water. The device may comprises a non-ferrous tube to conduct the water and which is surrounded by permanent magnet means or electromagnet means for producing a polarized magnetic field which is generally annular in configuration. The water passes through the center of the annular magnetic field. The magnetic field has a polarizing effect on minerals in solution in the water and induces a small negative millivolt energy potential which keeps the mineral salts in solution or suspension as they flow through the system. A slight reduction in surface tension occurs which makes the water more soluble, thereby allowing more solids to stay in solution or colloidal suspension before precipitating. A scale inhibitor suitable for this purpose is identified as Model No. AF 200 manufactured by AquaFlo Inc. 6244 Frankford Ave., Baltimore, Md. 21206. A conventional catalytic-type device may also be employed for polarizing positively charged ions in solution in the water.

The outlet of scale inhibitor means 80 is connected to a conduit 82. A conventional ozone generator 84 is connected by conduit 86 with a conventional Venturi injector 88 mounted within conduit 82. The ozone generator may be of the corona discharge type, an ultraviolet ozone generator, or the like. The Venturi injector causes the ozone gas to be entrained into the water in the form of very tiny bubbles thereby providing an exceptionally large surface area in which ozone transfers effectively into the water. A pair of one way check valves 90 and 92 are connected in conduit 86 to allow flow in the direction of the arrows, but prevent reverse flow of water toward the ozone generator. Pressure gauges 94 and 96 are connected to conduit 82 upstream and downstream of the injector whereby the injector may be monitored to see that it is operating properly so that the ozone is entrained into the water in the form of very tiny bubbles.

A conventional air dryer 100 is connected by conduit 102 with the ozone generator to provide dry air thereto. As indicated schematically by line 104, meter 74 is electrically connected to air dryer 100. The ph measurements obtained by the ph meter may be used to automatically control the operation of the air dryer. For example, if the ph of the water should be too high, and it is desired to acidify the water, the air dryer can be automatically turned off. On the other hand, if the ph of the water should drop too low, the air dryer can be automatically turned back on again. The electrical circuitry required to perform this function may be of conventional design. When moist air is passed over an electrical capacitor that can produce ozone, nitrous acid becomes a by-product. If the air is dried, the production of nitrous acid is reduced. Therefore, if the system water exceeds a predetermined pH level, the air dryer may be turned off periodically so that more nitrous acid is introduced into the system to reduce the ph.

It should be understood that ozone generator 84 does not necessarily have to be provided with dry air and may be provided with ambient air or oxygen. Furthermore, a compressor may be employed for injecting the ozone into the water. Such a compressor may be employed in combination with a Venturi injector or it may replace the Venturi injector.

As indicated schematically by line 106, the ORP meter 76 is electrically connected to the ozone generator 84. The ORP measurements may be used to automatically turn the ozone generator on and off in accordance with the ORP measurements obtained by the meter. The electrical circuitry required to perform this function may be of conventional design.

A valve 110, which may in the form of a conventional petcock, is provided in conduit 82 for sampling water from this portion of the system. A conventional inline mixer 112 is also connected in conduit 82 for thoroughly mixing the injected ozone with all of the water in the conduit. The mixer may be a static mixer including a plurality of baffles disposed within a tubular housing for providing the desired degree of mixing.

Conduit 82 discharges into a conventional centrifugal separator 120 which creates a circular flow of water therein causing solids of a certain size to fall to the bottom of the separator where they are removed through a conduit 122. The clarified water passes out through the top of the separator into a conduit 124 which discharges at point 126 in the sump of the cooling tower.

It should be noted that a closed by-pass water circuit which receives approximately 10–20% of the flow of water through the main water circuit includes conduits 62, 70, 82, 124 and the components connected therewith.

Conduit 122 is connected to the inlet of a conventional recovery tank 130 having a vent valve 132 at the upper portion thereof. A manually operable isolation valve 134 is connected in conduit 122 to isolate the recovery tank from the separator. Valve 134 may be a three-way valve including a position which bleeds conduit 122 to atmosphere. The recovery tank is provided with a removable filter bag 136. This filter bag is adapted to remove solids of a smaller size than those removed by the separator 120. The outlet of the recovery tank is connected to the inlet of a conventional annunciator 138 which may be set to provide an audible alarm/visible alarm when the filter bag within the recovery tank is clogged. The filter bag is then removed and a new bag inserted.

A conduit 140 is connected to the outlet of the annunciator, and a manually operated valve 142 is connected in the conduit for cutting off communication between the annunciator and the remainder of the conduit. A conventional pet cock valve 144 is connected in conduit 140 downstream of valve 142 for sampling water in conduit 140.

Conduit 140 discharges at 142 back into conduit 62 upstream of the pump 64 to return water to the closed by-pass circuit. It will be noted that conduits 122, 140 and the components connected therewith form a closed recovery water circuit within which water circulates and which is returned to the closed by-pass water circuit. Only a small portion of water containing removed solids is removed from the separator 120 and the by-pass water circuit to pass through the recovery water circuit. This small portion passing through the recovery water circuit may comprise approximately 10% of the water passing through the by-pass water circuit.

The invention has been described with reference to a preferred embodiment. Obviously, modifications, alterations and other embodiments will occur to others upon reading and understanding this specification. It is my intention to include all such modifications, alterations and alternate embodiments insofar as they come within the scope of the appended claims or the equivalent thereof.

What is claimed is:

1. The method of treating water in a cooling system comprising circulating water through a main water circuit including heat exchanger means and a cooling tower in which air contacts water to cool the water within the cooling tower, removing water from the main water circuit at a rate of about 10 to 20 percent of the flow of water through the main water circuit, circulating the water removed from the main water circuit through a closed by-pass water circuit, subjecting all of the water in the by-pass water circuit to a magnetic field to polarize solids in the water to allow more solids to stay in solution in the water as the water circulates through the cooling system to descale the cooling system, injecting ozone into all of the water in the by-pass circuit to oxidize and kill algae, slime and bacteria and enhance the descaling of the cooling system, removing solids of a certain size from all of the water in the by-pass water circuit to form clarified water and water containing separated solids, returning said clarified water to the main water circuit, removing from the by-pass water circuit said water containing solids at a rate of about 10 percent of the flow of water through the by-pass water circuit, circulating the water removed from the by-pass circuit through a closed recovery water circuit, removing solids from the water in the recovery water circuit of a smaller size than the solids removed in the by-pass water circuit, and returning the water in the recovery water circuit to mix with water in the by-pass water circuit upstream of the point where water in the by-pass water circuit is subjected to a magnetic field.

2. The method as defined in claim 1 including the step of thoroughly mixing the injected ozone with the water in the by-pass circuit subsequent to and at a point downstream from the point of injection of ozone into the water in the by-pass circuit.

3. The method as defined in claim 1 wherein the step of injecting ozone into the water in the by-pass circuit includes the step of passing the ozone through a Venturi injector to cause the ozone to be entrained into the water in the form of tiny bubbles thereby providing an exceptionally large surface area in which ozone transfers effectively into the water.

4. The method as defined in claim 1 wherein the step of removing solids of a certain size from the water in the by-pass circuit includes creating a circular flow of the water in the by-pass circuit within a centrifugal separator to separate out solids by centrifugal force.

5. The method as defined in claim 1 wherein the step of removing solids from the water in the recovery water circuit includes the step of filtering the water to remove solids of a smaller size than that of the solids removed in the by-pass circuit.

6. The method as defined in claim 1 wherein the step of removing solids from the water in the recovery water circuit includes the steps of passing through a filter bag in a recovery tank, and providing an indication when the filter bag should be emptied.

7. Apparatus for treating water in a cooling system comprising a main water circuit including a cooling tower and a heat exchanger, said heat exchanger including an inlet and an outlet, said heat exchanger inlet being connected with said cooling tower for receiving cooled water from said cooling tower, said cooling tower being connected with said heat exchanger outlet for receiving warmed water from said heat exchanger, means for causing circulation of water through said main water circuit, a closed by-pass water circuit receiving water from the main water circuit at a rate of about 10 to 20 percent of the flow of water through the main water circuit, said by-pass water circuit including means for subjecting all of the water in the by-pass water circuit to a magnetic field to polarize solids in the water to allow more solids to stay in solution in the water as the water circulates through the cooling system to descale the cooling system, said by-pass water circuit also including means for injecting ozone into all of the water in the by-pass circuit to oxidize and kill algae, slime and bacteria and enhance the descaling of the cooling system, said by-pass water circuit further including first means for removing solids of a certain size from all of the water in the by-pass water circuit to form clarified water and water containing separated solids, means for returning said clarified water to the main water circuit, a closed recovery water circuit for receiving said water containing solids at a rate of about 10 percent of the flow of water through the by-pass circuit, said recovery water circuit including means for removing solids from the water in the recovery water circuit of a smaller size than the solids removed in the by-pass circuit, and means for returning the water in the recovery water circuit to mix with water in the by-pass water circuit upstream of said means for subjecting water in the by-pass water circuit to a magnetic field.

8. Apparatus as defined in claim 7 including means for thoroughly mixing the injected ozone with the water in the by-pass circuit at a point downstream from the means for injecting ozone into the water in the by-pass circuit.

9. Apparatus as defined in claim 7 wherein the means for injecting ozone into the water in the by-pass water circuit comprises a Venturi injector which causes the ozone to be entrained into the water in the form of tiny bubbles thereby providing an exceptionally large surface area in which ozone transfers effectively into the water.

10. Apparatus as defined in claim 7 wherein the means for removing solids of a certain size from water in the by-pass circuit includes centrifugal separator means for creating a circular flow of the water in the by-pass circuit to separate out solids by centrifugal force.

11. Apparatus as defined in claim 7 wherein the means for removing solids from the water in the recovery water circuit includes a filter capable of filtering the water to remove solids of a smaller size than that of the solids removed by said first means.

12. Apparatus as defined in claim 7 wherein the means for removing solids from the water in the recovery water circuit comprises a recovery tank, a filter bag within said tank and means for providing an indication when the filter bag should be emptied.

13. The method of treating water circulating through a cooling system including a heat exchanger and a cooling tower in which air contacts water to cool the water within the cooling tower, comprising the steps of removing a minor portion of the water circulating through the heat exchanger and cooling tower, subjecting said portion of water to a magnetic field to polarize solids in the water to allow more solids to stay in solution in the water as the water circulates through the cooling system to descale the cooling system, injecting ozone into said portion of water to oxidize and kill algae, slime and bacteria and enhance the descaling of the cooling system, removing solids from said portion of water, and returning said portion of water which has been clarified to the water circulating through the heat exchanger and cooling tower, said step of injecting ozone into said portion of water including the steps of producing dried air and generating ozone from said dried air, measuring the ph of said portion of water to provide ph measurements, and controlling the production of dried air in accordance with said ph measurements.

14. Apparatus for treating water in a cooling system comprising a cooling tower, a heat exchanger including an inlet and an outlet, said heat exchanger inlet being connected with said cooling tower, for receiving cooled water from said cooling tower, said cooling tower being connected with said heat exchanger outlet for receiving warmed water from said heat exchanger, means for causing circulation of water through said cooling tower and heat exchanger, means for removing a minor portion of the water circulating through the heat exchanger and cooling tower, means for subjecting said portion of water to a magnetic field to polarize solids in the water to allow more solids to stay in solution in the water as the water circulates through the cooling system to descale the cooling system, means for injecting ozone into said portion of water to oxidize and kill algae, slime and bacteria and enhance the descaling of the cooling system, means for removing solids from said portion of water, and means for returning said portion of water which has been clarified to the water circulating through the heat exchanger and cooling tower, said means for injecting ozone into said portion of water including means for producing dried air, means for generating ozone from said dried air, means for measuring the ph of said portion of water to provide ph measurements, and means for controlling the production of dried air in accordance with said ph measurements.

* * * * *